US011881192B2

(12) United States Patent
Lal et al.

(10) Patent No.: US 11,881,192 B2
(45) Date of Patent: Jan. 23, 2024

(54) COMPENSATING FOR LATENCY IN A STREAMING VIRTUAL REALITY ENVIRONMENT

(71) Applicant: Charter Communications Operating, LLC, St. Louis, MO (US)

(72) Inventors: Dhananjay Lal, Englewood, CO (US); Andrew Ip, Centennial, CO (US); Matthew Ringenberg, Denver, CO (US); Dell Wolfensparger, Langley, WA (US); Mun G. Choi, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/543,208

(22) Filed: Dec. 6, 2021

(65) Prior Publication Data

US 2022/0093063 A1 Mar. 24, 2022

Related U.S. Application Data

(63) Continuation of application No. 16/743,765, filed on Jan. 15, 2020, now Pat. No. 11,195,498.

(51) Int. Cl.
*G09G 5/37* (2006.01)
*H04L 12/26* (2006.01)
*G09G 5/14* (2006.01)
*G06F 3/01* (2006.01)
*H04L 43/0864* (2022.01)

(52) U.S. Cl.
CPC ............... *G09G 5/37* (2013.01); *G06F 3/012* (2013.01); *G09G 5/14* (2013.01); *H04L 43/0864* (2013.01); *G09G 2354/00* (2013.01)

(58) Field of Classification Search
CPC ........ G06T 19/006; G06F 3/011; G06F 3/013; G06F 3/012; G06F 1/163; G02B 27/017; G02B 27/01; G02B 2027/0178
See application file for complete search history.

(56) References Cited

U.S. PATENT DOCUMENTS

| 2008/0218436 | A1 | 9/2008 | Lipscomb |
| 2010/0091096 | A1 | 4/2010 | Oikawa et al. |
| 2013/0047217 | A1 | 2/2013 | Shuster et al. |

(Continued)

OTHER PUBLICATIONS

Non-Final Office Action for U.S. Appl. No. 16/743,765, dated Sep. 29, 2020, 24 pages.

(Continued)

*Primary Examiner* — Dong Hui Liang
(74) *Attorney, Agent, or Firm* — Dority & Manning, P.A.

(57) ABSTRACT

Compensating for latency in a streaming virtual reality environment is disclosed. A computing device receives from a head-mounted display device (HMDD) having a field of view (FOV), first pose data that identifies an orientation of the HMDD worn by a participant viewing a virtual world via the HMDD. The computing device renders, based at least in part on the first pose data and a first oversized FOV that is greater than the FOV, oversized imagery that depicts a portion of the virtual world within the FOV of the HMDD and a portion of the virtual world outside of the FOV of the HMDD. The computing device communicates the oversized imagery to the HMDD.

19 Claims, 9 Drawing Sheets

(56) References Cited

U.S. PATENT DOCUMENTS

| | | | |
|---|---|---|---|
| 2013/0157762 A1 | 6/2013 | Yamaguchi et al. | |
| 2013/0328927 A1 | 12/2013 | Mount et al. | |
| 2015/0379772 A1 | 12/2015 | Hoffman | |
| 2017/0251068 A1* | 8/2017 | Kappler | H04L 69/16 |
| 2018/0047332 A1* | 2/2018 | Kuwahara | G09G 3/2096 |
| 2018/0161676 A1* | 6/2018 | Ikeda | A63F 13/25 |
| 2018/0182273 A1 | 6/2018 | Hwang et al. | |
| 2018/0218714 A1 | 8/2018 | Yamaguchi et al. | |
| 2018/0315364 A1 | 11/2018 | Yamamoto et al. | |
| 2019/0313160 A1 | 10/2019 | Stokking et al. | |
| 2020/0132996 A1 | 4/2020 | Yokota | |
| 2021/0217386 A1 | 7/2021 | Lal et al. | |

OTHER PUBLICATIONS

Final Office Action for U.S. Appl. No. 16/743,765, dated Mar. 2, 2021, 28 pages.
Applicant-Initiated Interview Summary for U.S. Appl. No. 16/743,765, dated May 4, 2021, 2 pages.
Advisory Action, Examiner-Initiated Interview Summary, and AFCP 2.0 Decision for U.S. Appl. No. 16/743,765, dated May 21, 2021, 5 pages.
Notice of Allowance for U.S. Appl. No. 16/743,765, dated Aug. 5, 2021, 10 pages.

* cited by examiner

COMPENSATING FOR LATENCY IN A STREAMING VIRTUAL REALITY ENVIRONMENT

RELATED APPLICATION

This application is a continuation of co-pending U.S. patent application Ser. No. 16/743,765, filed on Jan. 15, 2020, entitled "COMPENSATING FOR LATENCY IN A STREAMING VIRTUAL REALITY ENVIRONMENT," which is hereby incorporated herein by reference in its entirety.

BACKGROUND

Head-mounted display devices (HMDDs) are often used to provide an immersive experience to a participant in a virtual world. Rendering high-resolution imagery that depicts the virtual world to the participant via the HMDD as the participant moves about the virtual world can require a substantial amount of processing power.

SUMMARY

The embodiments disclosed herein eliminate the visual discontinuities that may occur in a streaming virtual reality (VR) environment when a participant moves their head and thereby adjusts their field of view (FOV) within the virtual world.

In one embodiment a method is provided. The method includes receiving, by a computing device from a head-mounted display device (HMDD) having a field of view (FOV), first pose data that identifies an orientation of the HMDD worn by a participant viewing a virtual world via the HMDD. The method further includes rendering, based at least in part on the first pose data and a first oversized FOV that is greater than the FOV, oversized imagery that depicts a portion of the virtual world within the FOV of the HMDD and a portion of the virtual world outside of the FOV of the HMDD. The method further includes communicating the oversized imagery to the HMDD.

In another embodiment a computing device is provided. The computing device includes a memory and a processor device coupled to the memory. The processor device is configured to receive, from a head-mounted display device (HMDD) having a field of view (FOV), first pose data that identifies an orientation of the HMDD worn by a participant viewing a virtual world via the HMDD. The processor device is further configured to render, based at least in part on the first pose data and a first oversized FOV that is greater than the FOV, oversized imagery that depicts a portion of the virtual world within the FOV of the HMDD and a portion of the virtual world outside of the FOV of the HMDD. The processor device is further configured to communicate the oversized imagery to the HMDD.

In another embodiment a computer program product is provided. The computer program product is stored on a non-transitory computer-readable storage medium and includes instructions configured to cause a processor device to receive, from a head-mounted display device (HMDD) having a field of view (FOV), first pose data that identifies an orientation of the HMDD worn by a participant viewing a virtual world via the HMDD. The instructions further cause the processor device to render, based at least in part on the first pose data and a first oversized FOV that is greater than the FOV, oversized imagery that depicts a portion of the virtual world within the FOV of the HMDD and a portion of the virtual world outside of the FOV of the HMDD. The instructions further cause the processor device to communicate the oversized imagery to the HMDD.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
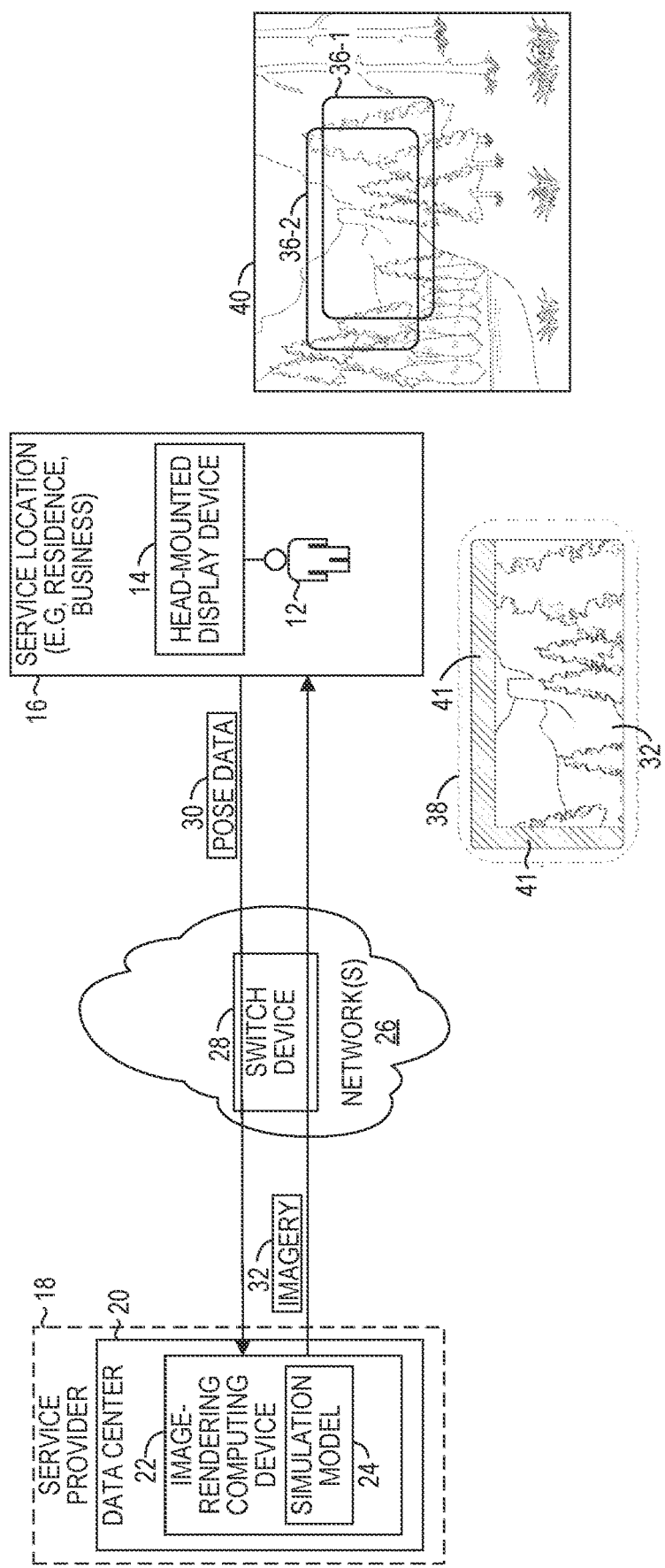
FIG. 1 is a block diagram of an environment that may be utilized to stream virtual reality (VR) content.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Head-mounted displays (HMDDs) are often used to provide an immersive experience to a participant in a virtual world. Rendering high-resolution imagery that depicts the virtual world to the participant via the HMDD as the participant moves about the virtual world can require a substantial amount of processing power.

Image-rendering graphics processing units (GPUs) can require a substantial amount of power, may be relatively costly, and may even require a cooling system to prevent overheating. Accordingly, in order to make an HMDD lightweight and compact, and therefore comfortable for a participant, an HMDD may lack an image-rendering GPU. Instead, a computing device with one or more GPUs may, in real-time, generate and stream to the HMDD virtual world imagery that depicts the virtual world based on the current virtual location of the participant in the virtual world, and the current orientation (including the direction) of the view of the participant in the virtual world.

In practice, any number of switches, bridges, routers or other communications devices (referred to generally herein as "switch devices") may be in the communications path between the image-rendering computing device and the HMDD. Moreover, in some implementations, there may be a relatively large physical distance between the image-rendering computing device and the HMDD. These and other factors can result in latency. Latency, as used herein, refers to the delay in a packet of information communicated from one device, such as an image-rendering computing device, to another device, such as an HMDD. Latency may be a result of any number of factors, including, by way of non-limiting example, physical distance between the image-rendering computing device and the HMDD, the number of switch devices in the communications path between the image-rendering computing device and the HMDD, network conditions, the types of media used to interconnect devices in the communications path, changing load conditions on one or more of the devices, and the like.

An HMDD has a field of view (FOV) that defines a horizontal and vertical extent of what a participant in a virtual world can perceive at an instant in time. An FOV is often defined in terms of horizontal degrees and vertical degrees. As a participant in a virtual world moves about the virtual world, the HMDD continuously provides orientation and movement data to the image-rendering computing device. As the participant moves her head, the scene encompassed by the FOV of the HMDD changes, similar or identical to the manner in which the scene within the FOV of human eyes change as a human moves her ahead about the real world.

If a participant moves their head slowly in a virtual world, the delay of time between the HMDD sending a current location and orientation of the HMDD, the rendering of the corresponding imagery, the communication of the rendered imagery to the HMDD and the presentation of the rendered imagery on the HMDD to the participant may result in few or no visual discontinuities. However, where a participant relatively rapidly moves their head about a virtual world, the delay of time may result in substantial visual discontinuities in the form of banding, blacked-out portions of the scene, or the like, which may lead to an unpleasant experience for the participant.

The embodiments disclosed herein eliminate the visual discontinuities that may occur in a streaming virtual reality (VR) environment when a participant moves their head and thereby adjusts their view of the virtual world. In particular, the embodiments relate to methods and systems that, based on a current orientation of an HMDD of a participant in a virtual world, render oversized imagery that depicts a portion of the virtual world within the FOV of the HMDD and a portion of the virtual world outside of the FOV of the HMDD. The HMDD may then receive the oversized imagery, determine a current FOV of the HMDD in the virtual world based on a current real-time orientation of the HMDD, extract from the oversized imagery the scene within the oversized imagery that is encompassed by the current FOV, and present the scene in the HMDD. The embodiments thereby eliminate visual discontinuities that may otherwise occur in a streaming VR environment.

FIG. 1 is a block diagram of a streaming VR environment 10 that may be utilized to stream VR content. The streaming VR environment 10 includes a participant 12 who is wearing an HMDD 14. The HMDD 14 has an associated FOV, such as, by way of non-limiting example, an FOV of 80° horizontal and 60° vertical. The participant 12 in this example is in a service location 16, such as a residence or business, which obtains service from a service provider 18. The service provider 18 maintains one or more data centers 20. The data center 20 includes an image-rendering (IR) computing device 22 (hereinafter computing device 22 for purposes of brevity) and a simulation model 24 that reflects the state of a virtual world at a given instant in time.

The data center 20 is communicatively coupled to the HMDD 14 via one or more networks 26. The network 26 may include one or more different transmission mediums, such as, by way of non-limiting example, an optical transmission medium, an electrical transmission medium, a wireless transmission medium, or any combination thereof. The network 26 includes at least one intermediate switch device 28 that comprises a router, a switch, a bridge, an optical-to-electrical converter, an electrical-to-optical converter, or the like.

In this example, the participant 12 is participating in a virtual world implemented by the simulation model 24. The HMDD 14 relatively continuously streams information to the computing device 22 via the network 26 that identifies actions taken by the participant 12, such as activation of weapons, location movements, and the like. The computing device 22 continuously updates the simulation model 24 in response to actions taken by the participant 12 to reflect a current state of the virtual world. The HMDD 14 also relatively continuously streams pose data 30 that identifies an orientation of the HMDD 14. The pose data 30 may include, for example, roll, yaw and pitch data generated by an inertial measurement unit sensor (IMU) of the HMDD 14. In some embodiments, the HMDD 14 may pre-process the roll, yaw and pitch data to generate the pose data 30.

The computing device 22 receives the pose data 30 and iteratively, based on the most recently received pose data 30, determines a scene within the virtual world that is within an FOV of the HMDD 14. The computing device 22 renders imagery 32 that depicts the scene based on the state of the simulation model 24 at that instant in time, the orientation of the HMDD 14 identified in the pose data 30, and the FOV of the HMDD 14, and sends the imagery 32 to the HMDD 14 via the network 26. The HMDD 14 receives the imagery 32 and presents the imagery 32 on a display device of the HMDD 14 for viewing by the participant 12. This process happens periodically, such as 30 or 60 times a second. In this manner, the participant 12 can be presented with imagery of the virtual world consistent with movements of the participant 12, resulting in an enjoyable immersive experience for the participant 12.

Latency can result in visual discontinuities that are unpleasant for the participant 12. As an example, assume that at a time T1 the HMDD 14 is at a first orientation, and at the first orientation, the FOV of the HMDD 14 encompasses a scene 36-1 of a portion 40 of a virtual world implemented by the simulation model 24. The HMDD 14 generates and sends the pose data 30 that identifies the first orientation. The computing device 22 generates the imagery 32 that depicts the scene 36-1 of the portion 40 of the virtual world. In between the time the pose data 30 was sent to the computing device 22 and before the imagery 32 is presented on the display device of the HMDD 14, the participant 12 moves her head such that the HMDD 14 is now at a second orientation which encompasses a scene 36-2 of the portion 40 of the virtual world. The rapid change in orientation of the HMDD 14 can result in visual discontinuities, as visually depicted by inset 38. Inset 38 illustrates what the participant 12 may see under these circumstances. The participant 12 is presented with at least a portion of the imagery 32, but is also presented with one or more black or darkened bands 41 that result in an unsatisfying simulation experience. The greater the latency and the more rapid the head movements of the participant 12, the greater this problem may be.

Figure 2:
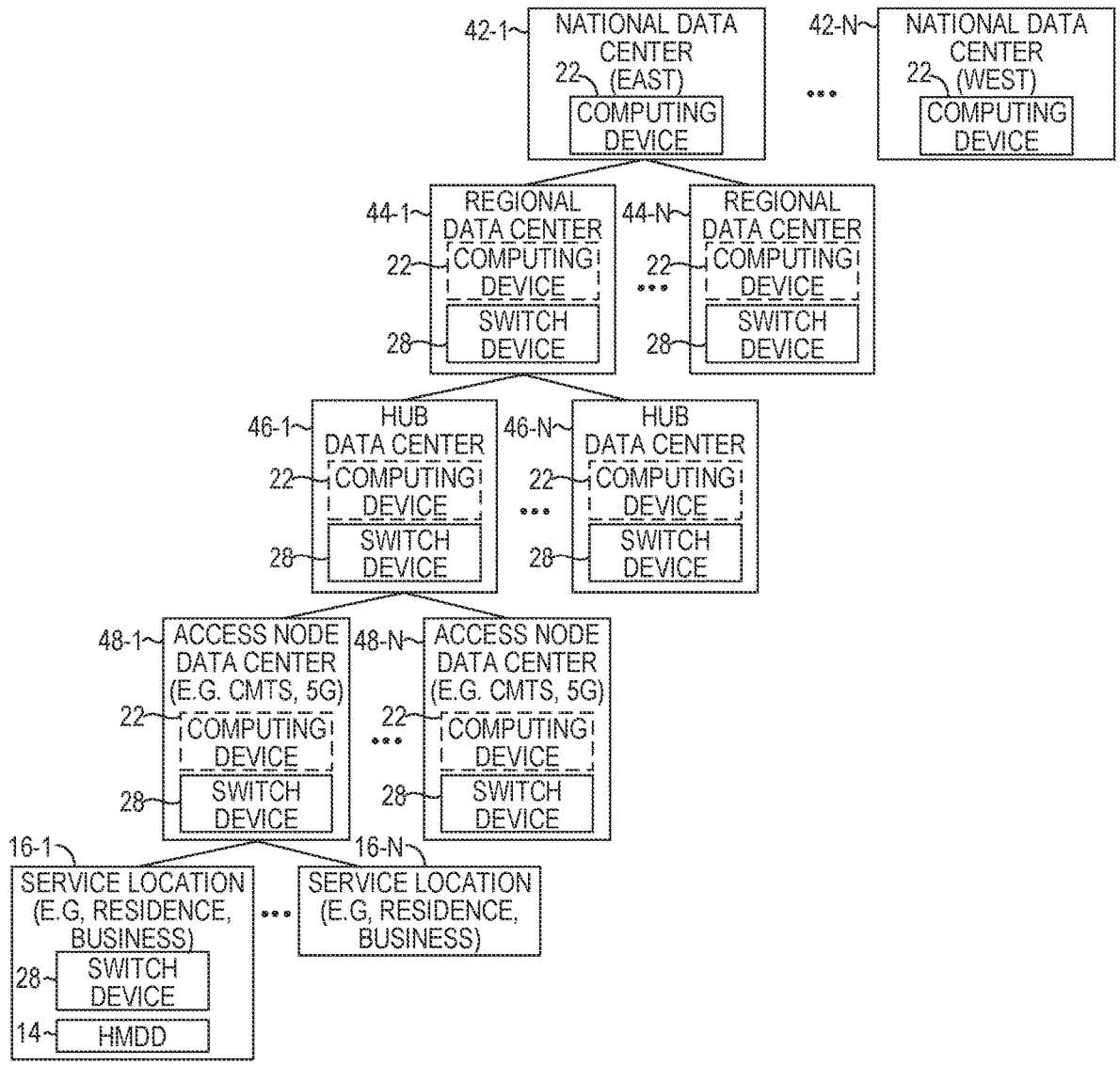
FIG. 2 is a block diagram illustrating a network that may be utilized in compensating for latency in a streaming VR environment, according to one embodiment.

FIG. 2 is a block diagram illustrating a network 26-1 in accordance with one embodiment. In this embodiment, the network 26-1 is that of a national service provider that has one or more national data centers 42-1-42-N (generally, national data centers 42). Each national data center 42 may serve different regions of a country. Each national data center 42 may also include one or more image-rendering (IR) computing devices 22 that are suitable for rendering imagery of a virtual world. In other words, the IR computing devices 22 may contain suitable central processing units, graphics processing units and suitable electrical and cooling infrastructure suitable for high-resolution image generation.

Each of the national data centers 42 is communicatively coupled to a plurality of regional data centers 44-1-44-N (illustrated only with respect to the national data center 42-1 due to space considerations). The regional data centers 44-1-44-N may also have one or more IR computing devices 22. The regional data centers 44-1-44-N include one or more switch devices 28 which process communications that traverse through the respective regional data centers 44-1-44-N.

Each of the regional data centers 44-1-44-N is communicatively coupled to a plurality of hub data centers 46-1-46-N (illustrated only with respect to the regional data center 44-1 due to space considerations). The hub data centers 46-1-46-N may also have one or more IR computing devices 22 suitable for rendering imagery. The hub data centers 46-1-46-N include one or more switch devices 28, which process communications that traverse through the respective hub data centers 46-1-46-N.

Each of the hub data centers 46-1-46-N is communicatively coupled to a plurality of access node data centers 48-1-48-N (illustrated only with respect to the hub data center 46-1 due to space considerations). The access node data centers 48-1-48-N may also have one or more IR computing devices 22 suitable for rendering imagery. The access node data centers 48-1-48-N include one or more switch devices 28, which process communications that traverse through the respective access node data centers 48-1-48-N.

Each of the access node data centers 48-1-48-N is communicatively coupled to one or more service locations 16-1-16-N (illustrated only with respect to the access node data center 48-1 due to space considerations). The service location 16-1 includes the HMDD 14, and may also include one or more switch devices 28, such as an optical-to-electrical converter and a local area network (LAN) router.

Imagery 32 (FIG. 1) generated by the computing device 22 of the national data center 42-1 and communicated to the HMDD 14 traverses through one or more switch devices 28 in the regional data center 44-1, one or more switch devices 28 in the hub data center 46-1, one or more switch devices 28 in the access node data center 48-1, and perhaps one or more switch devices 28 of the service location 16-1 prior to reaching the HMDD 14. Each of these switch devices 28 introduce at least a small amount of latency. Moreover, the national data center 42-1 may be geographically hundreds or thousands of miles from the service location 16-1, resulting in additional latency. The pose data 30 (FIG. 1) sent by the HMDD 14 to the computing device 22 of the national data center 42-1 traverses the same path, in reverse.

The network 26-1 is hierarchical, and each descending level has a greater number of data centers. Thus, there are a greater number of regional data centers 44 than national data centers 42, a greater number of hub data centers 46 than regional data centers 44, and a greater number of access node data centers 48 than hub data centers 46. Generating the imagery 32 in the access node data center 48-1 would reduce latency; however, the costs of provisioning each access node data center 48 with one or more IR computing devices 22, along with suitable electrical and cooling infrastructure, may be cost prohibitive. From a cost standpoint, it would be desirable to only provision the national data centers 42 with the IR computing devices 22 because there are fewer national data centers 42; however, the latency will be greatest in the communications path between the national data center 42-1 and the HMDD 14 than that of any other data center at a lower hierarchical level of the network 26-1 and the HMDD 14.

Figure 3:
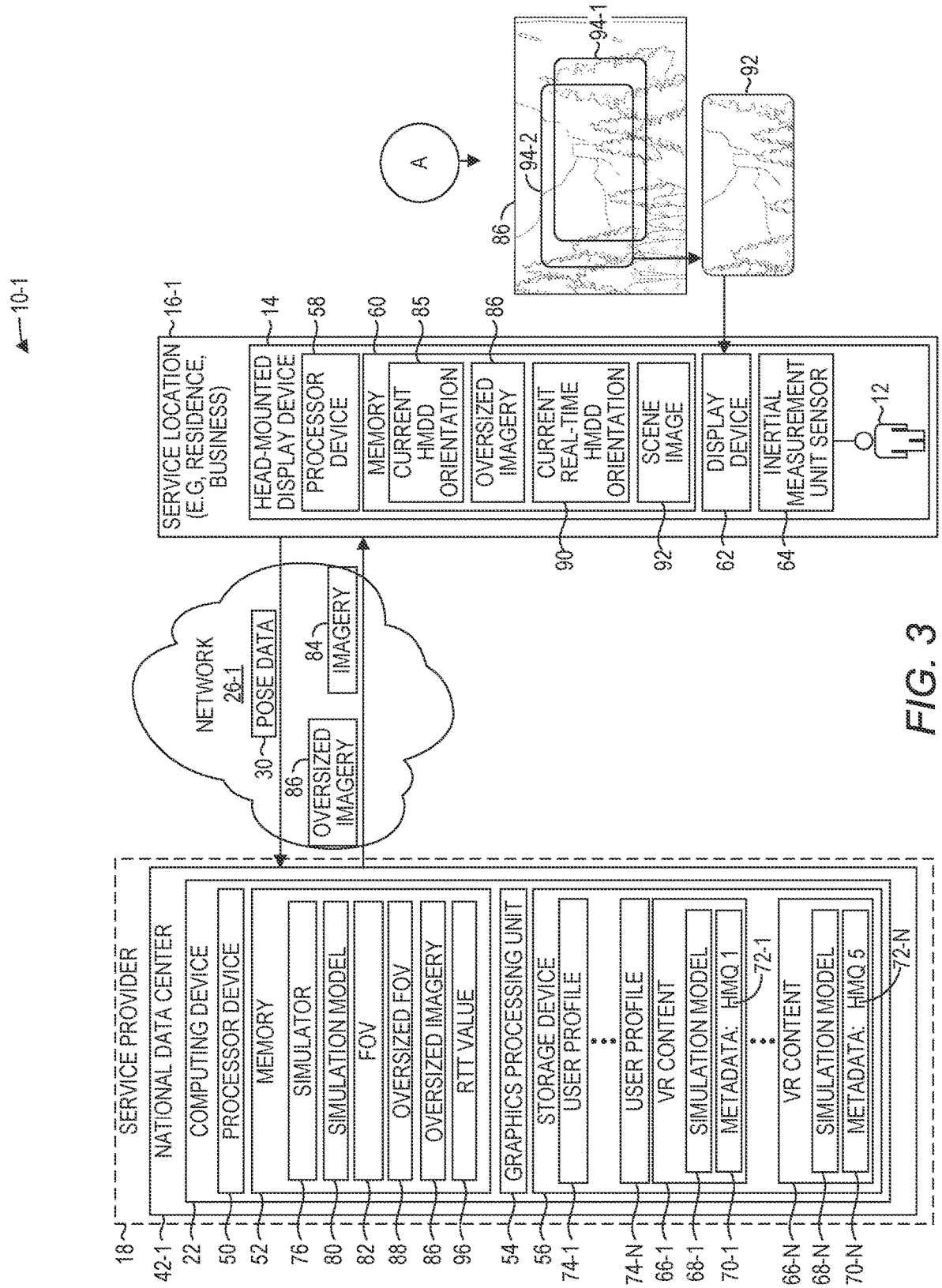
FIG. 3 is a block diagram of an environment suitable for compensating for latency in a streaming VR environment, according to one embodiment.

The embodiments disclosed herein help eliminate, or greatly reduce, the effects of latency in a streaming VR system and thus allow greater flexibility in determining where in a complex network, such as the network 26-1, the imagery may be generated. In this regard, FIG. 3 is a block diagram of a streaming VR environment 10-1 suitable for compensating for latency in a streaming VR environment according to one embodiment. The streaming VR environment 10-1 includes the national data center 42-1 and the service location 16-1. The national data center 42-1 includes the computing device 22, which in turn includes a processor device 50, a memory 52 and a graphics processing unit 54. The computing device 22 includes, or is communicatively coupled to, a storage device 56.

The HMDD 14 includes a processor device 58, a memory 60, a display device 62 and an inertial measurement unit sensor (IMU) 64. The HMDD 14 is configured to be coupled to a head of the participant 12, such as via a frame similar to glasses, or via straps, a helmet, a cap, or the like.

The computing device 22 has access to a plurality of different VR contents 66-1-66-N (generally, VR content 66) maintained on the storage device 56 and that may be selected by a participant 12. Each VR content 66 implements a virtual world that can be experienced by the participant 12 via the HMDD 14. As an example, a first VR content 66 may implement a first-person shooter virtual world, a second VR content 66 may implement a chess game virtual world, and a third VR content may implement a medieval virtual world in which the participant 12 can move about and explore at her leisure.

Each of the VR contents 66-1-66-N has a corresponding starting simulation model 68-1-68-N that identifies objects in the virtual world and initial states of such objects. Each of the VR contents 66-1-66-N also includes metadata 70-1-70-N that contains information about the corresponding VR contents 66-1-66-N. The metadata 70-1-70-N includes corresponding head-movement quantifiers (HMQ) 72-1-72-N (generally, HMQ 72). Each HMQ 72 corresponds to a maximum rotation velocity of a head of a participant participating in the virtual world implemented by the corresponding VR content 66. As an example, a participant in a chess game virtual world may move their head very slowly and in very small rotational movements, while a participant in a first-person shooter virtual world may move their head rapidly and in relatively large rotational movements.

The HMQs 72 may be provided by a developer of the corresponding VR content 66, may be determined experimentally by monitoring a number of participants over a period of time participating in the corresponding virtual world, and/or may be determined based on the real-world activities of participants participating in virtual worlds implemented by the VR contents 66.

In some embodiments an HMQ 72 may be a rank. The ranking system may be of any granularity, such as three ranks, five ranks, ten ranks, or the like. Each rank may correspond to a different maximum rotation velocity of a head of a participant in some desired units, such as, by way of non-limiting example, degrees per second, or radians per second. For example, in a three rank HMQ system, rank 1 may equate to 40 degrees per second, rank 2 may correspond to 25 degrees per second, and rank 3 may correspond to 10 degrees per second. In other embodiments the HMQs 72 identify an actual rotation velocity of a head in some desired units, such as, by way of non-limiting example, degrees per second, or radians per second. The storage device 56 may also include a plurality of user profiles 74-1-74-N that include information about subscribers of the service provider 18.

For purposes of illustrating compensating for latency in the streaming VR environment 10-1, assume that the participant 12 desires to participate in a virtual world. The participant 12 may manipulate the HMDD 14, or another device located in the service location 16-1, to cause the computing device 22 to provide a menu of selection of the VR content 66-1-66-N. The participant 12 selects the VR content 66-1. The computing device 22 includes a simulator 76. The simulator 76 accesses the simulation model 68-1 and generates a simulation model 80 based on the simulation model 68-1 that is initially at the same state as the simulation model 68-1, which is an initial default state. As the participant participates in the virtual world implemented by the simulation model 80, the simulator 76 updates the simulation model 80 to reflect a current state of the virtual world.

It is noted that because the simulator 76 is a component of the computing device 22, functionality implemented by the simulator 76 may be attributed to the computing device 22 generally. Moreover, in examples where the simulator 76 comprises software instructions that program the processor device 50 to carry out functionality discussed herein, functionality implemented by the simulator 76 may be attributed herein to the processor device 50.

The simulator 76 determines an FOV 82 of the HMDD 14. The FOV 82 may have two components: a horizontal FOV and a vertical FOV. The FOV 82 may correspond to a particular model of HMDD 14, and may be provided by the HMDD 14 in initial handshake communications between the computing device 22 and the HMDD 14 after selection of the VR content 66-1; may be contained, for example, in the user profile 74 that corresponds to the participant 12; or may be determined in some other manner. The HMDD 14 may also provide initial pose data 30 that identifies an initial orientation of the HMDD 14.

The simulator 76, based on the FOV 82, the orientation of the HMDD 14, and a starting location of the participant 12 in the virtual world, generates imagery 84 that depicts a scene of the virtual world that is within the FOV 82. The initial imagery 84 may or may not be oversized imagery, as described and discussed below. The HMDD 14 receives the imagery 84 and presents the imagery 84 on the display device 62 for viewing by the participant 12.

A continuous loop of communications begins between the HMDD 14 and the computing device 22. Periodically or intermittently the HMDD 14 sends data, including the pose data 30, to the simulator 76 via the network 26-1. The pose data 30 is based on data generated by the IMU 64, and identifies a current HMDD orientation 85 of the HMDD 14 as the participant 12 moves their head to view different parts of the virtual world. The pose data 30 may be sent periodically, such as 30 or 60 times a second, or upon each detected movement of the HMDD 14. If the participant continuously moves their head, the HMDD 14 may relatively continuously send the pose data 30 to the simulator 76. The HMDD 14 may send other data to the simulator 76 that identifies manipulations of an input device of the user, such as a trigger pull of a weapon, or a movement of a mouse, as such manipulations occur.

The simulator 76 receives the data sent by the HMDD 14, and periodically, such as 30 or 60 times a second, generates oversized imagery 86 (sometimes referred to as "over-rendered imagery 86") based on a number of factors, such as the current orientation of the HMDD 14 identified by the most recently received pose data 30, the current location of the participant 12 in the virtual world, the oversized FOV 88, and one or more additional latency-compensating factors described in greater detail below. The oversized imagery 86 depicts the scene that would be within the FOV 82 based on the most recently received pose data 30, and a portion of the virtual world outside of that scene. The oversized FOV 88 is thus a larger FOV than the FOV 82 of the HMDD 14.

The FOV 88 is related to a view frustum used by the simulator 76 to intersect the simulation model 80 and thereby determine what objects in the simulation model 80 are within the FOV 88 and therefore should be rendered. The oversized imagery 86 contains imagery of the virtual world that is within the FOV 88, and also a portion of the virtual world that is outside of the FOV 88 and the view frustum.

The HMDD 14 receives the oversized imagery 86 and accesses the most recent data from the IMU 64 to determine a current real-time HMDD orientation 90 of the HMDD 14. Based on the FOV 82 of the HMDD 14 and the current real-time HMDD orientation 90, the HMDD 14 extracts a scene image 92 from the oversized imagery 86, and presents the scene image 92 on the display device 62. Thus, even if the participant 12 has moved their head in the interim between the sending of the pose data 30 and the receipt of the corresponding oversized imagery 86 from the simulator 76, the HMDD 14 can extract the scene image 92 from the oversized imagery 86 that matches the new real-time orientation of the HMDD 14, eliminating banding or other visual discontinuities.

As an example, as illustrated at inset A in FIG. 1, at a time T1 a scene 94-1 is within the FOV of the HMDD 14 based on the location of the participant 12 and the pose data 30 at that instance in time. The HMDD 14 generates the pose data 30 and sends the pose data 30 to the simulator 76. The simulator 76, based on the pose data 30, the location of the participant 12 in the virtual world, and the oversized FOV 88, generates an oversized imagery 86 that encompasses the scene 94-1 but also encompasses portions of the virtual world adjacent to the scene 94-1. At a time T2, the HMDD 14 receives the oversized imagery 86, and determines the current real-time HMDD orientation 90 based on the most recent data generated by the IMU 64. Based on the current real-time HMDD orientation 90, a scene 94-2 is within the FOV of the HMDD 14. The HMDD 14 extracts the scene image 92 that depicts the scene 94-2 from the oversized imagery 86, and presents the scene image 92 on the display device 62.

To determine the oversized FOV 88, the simulator 76 uses one or more latency-compensation factors. In some embodiments, the simulator 76 may simply utilize a predetermined multiplication factor, such as 1.4, 1.6 or the like, that is applied to the FOV 82 to derive the oversized FOV 88. The predetermined multiplication factors may be different for the horizontal FOV of the FOV 82 and the vertical FOV of the FOV 82 in recognition that in some virtual worlds one movement, such as horizontal movement, might be generally more common and/or more rapid than vertical movement. The predetermined multiplication factors may be based on the particular VR content 66, and may be identified in the metadata 70.

In other embodiments, the latency-compensation factors may comprise the HMQ 72-1, which quantifies a maximum rotation velocity of a head of a typical participant participating in the virtual world implemented by the corresponding VR content 66, and a round-trip time (RTT) value 96 that quantifies an elapsed time of a signal communicated from the computing device 22 through the network 26-1 to the HMDD 14 and receipt, by the computing device 22, of a response from the HMDD 14 to the signal. The RTT value 96 may also include an amount of time that represents an expected processing time of the computing device 22 and the HMDD 14, such as the processing time necessary for the computing device 22 to render an oversized imagery 86 and encode the oversized imagery 86, and the processing time necessary for the HMDD 14 to decode the oversized imagery 86 and extract the scene image 92. Mechanisms for determining the oversized FOV 88 utilizing the HMQ 72-1 and the RTT value 96 are discussed below with reference to FIG. 7.

The RTT value 96 may be determined in any number of manners. In one embodiment, the computing device 22 may periodically send an internet control message protocol (ICMP) echo request to the HMDD 14, receive a response to the ICMP echo request from the HMDD 14, and determine the amount of time between sending the ICMP echo request and receiving the response to the ICMP echo request. The computing device 22 may also add a predetermined value to that amount of time to account for image processing performed by the computing device 22 and the HMDD 14.

In some embodiments, the computing device 22 may determine the RTT value 96 in this manner periodically while the participant 12 is participating in the virtual world, and thus, in some embodiments the RTT value 96 may change while the participant 12 participates in the virtual world, and thus the oversized FOV 88 may also change. If the RTT value 96 decreases, the size of the oversized FOV 88 may be reduced, and if the RTT value 96 increases, the size of the oversized FOV 88 may be increased. In some other embodiments, the RTT value 96 may be predetermined, and may be based on measurements taken between the computing device 22 and the service location 16-1, or between the computing device 22 and a plurality of different service locations 16.

Figure 4:
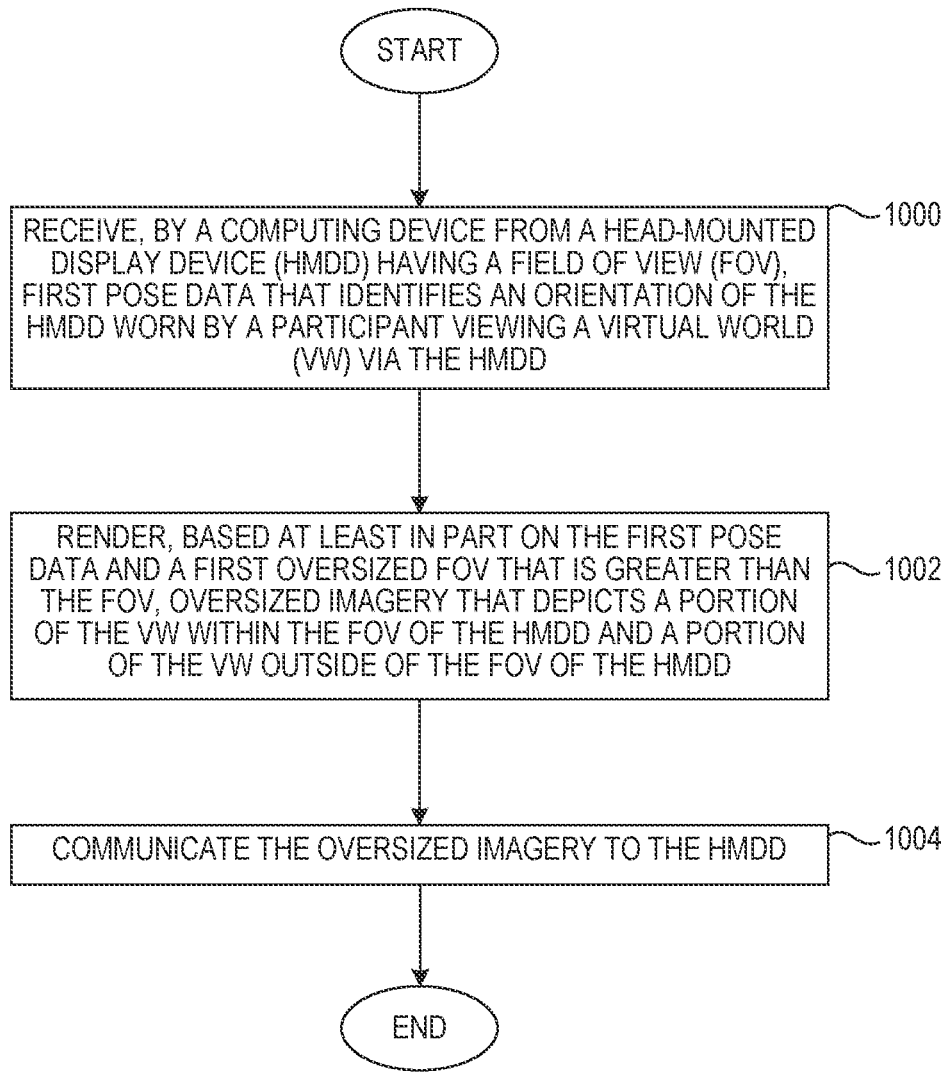
FIG. 4 is a flowchart of a method for compensating for latency in a streaming VR environment from the perspective of an image-rendering computing device, according to one embodiment.

FIG. 4 is a flowchart of a method for compensating for latency in a streaming VR environment from the perspective of the computing device 22, according to one embodiment. FIG. 4 will be discussed in conjunction with FIG. 3. The computing device 22 receives, from the HMDD 14 having the FOV 82, the pose data 30 that identifies an orientation of the HMDD 14 worn by the participant 12 viewing the virtual world via the HMDD 14 (FIG. 4, block 1000). The computing device 22 renders, based at least in part on the pose data 30 and the oversized FOV 88 that is greater than the FOV 82, the oversized imagery 86 that depicts a portion of the virtual world within the FOV 82 of the HMDD 14 and a portion of the virtual world outside of the FOV 82 of the HMDD 14 (FIG. 4, block 1002). The computing device 22 communicates the oversized imagery 86 to the HMDD 14 (FIG. 4, block 1004).

Figure 5:
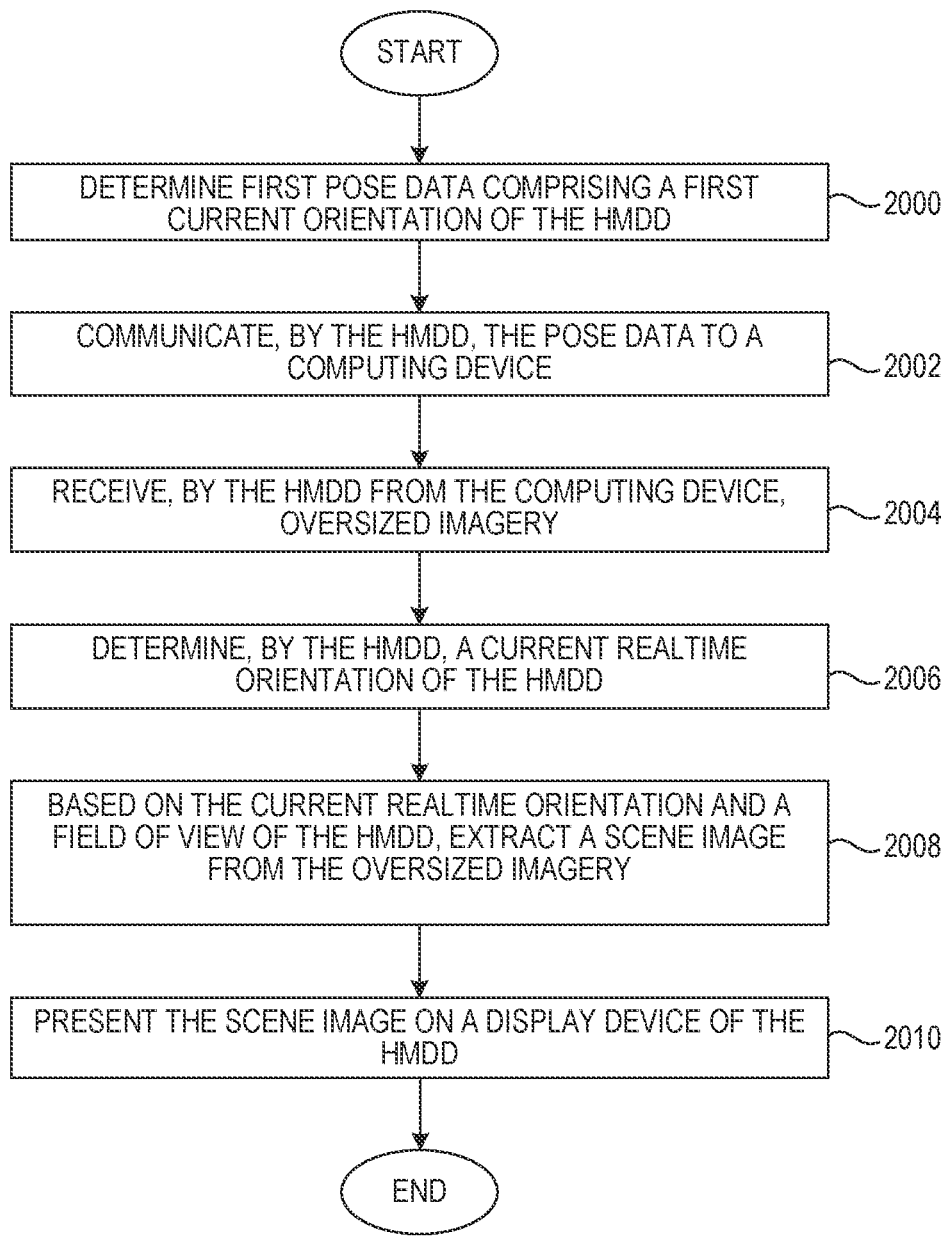
FIG. 5 is a flowchart of a method for compensating for latency in a streaming VR environment from the perspective of a head-mounted display device, according to one embodiment.

FIG. 5 is a flowchart of a method for compensating for latency in a streaming VR environment from the perspective of the HMDD 14, according to one embodiment. FIG. 5 will be discussed in conjunction with FIG. 3. The HMDD 14 determines the pose data 30 that identifies a current orientation of the HMDD 14 (FIG. 5, block 2000). The HMDD 14 communicates the pose data 30 to the computing device 22 (FIG. 5, block 2002). The HMDD 14 receives, from the computing device 22, the oversized imagery 86 (FIG. 5, block 2004). The HMDD 14 determines the current real-time HMDD orientation 90 (FIG. 5, block 2006). Based on the current real-time HMDD orientation 90 and the FOV of the HMDD 14, the HMDD 14 extracts the scene image 92 from the oversized imagery 86 (FIG. 5, block 2008). The HMDD 14 presents the scene image 92 on the display device 62 of the HMDD 14 (FIG. 5, block 2010).

Figure 6:
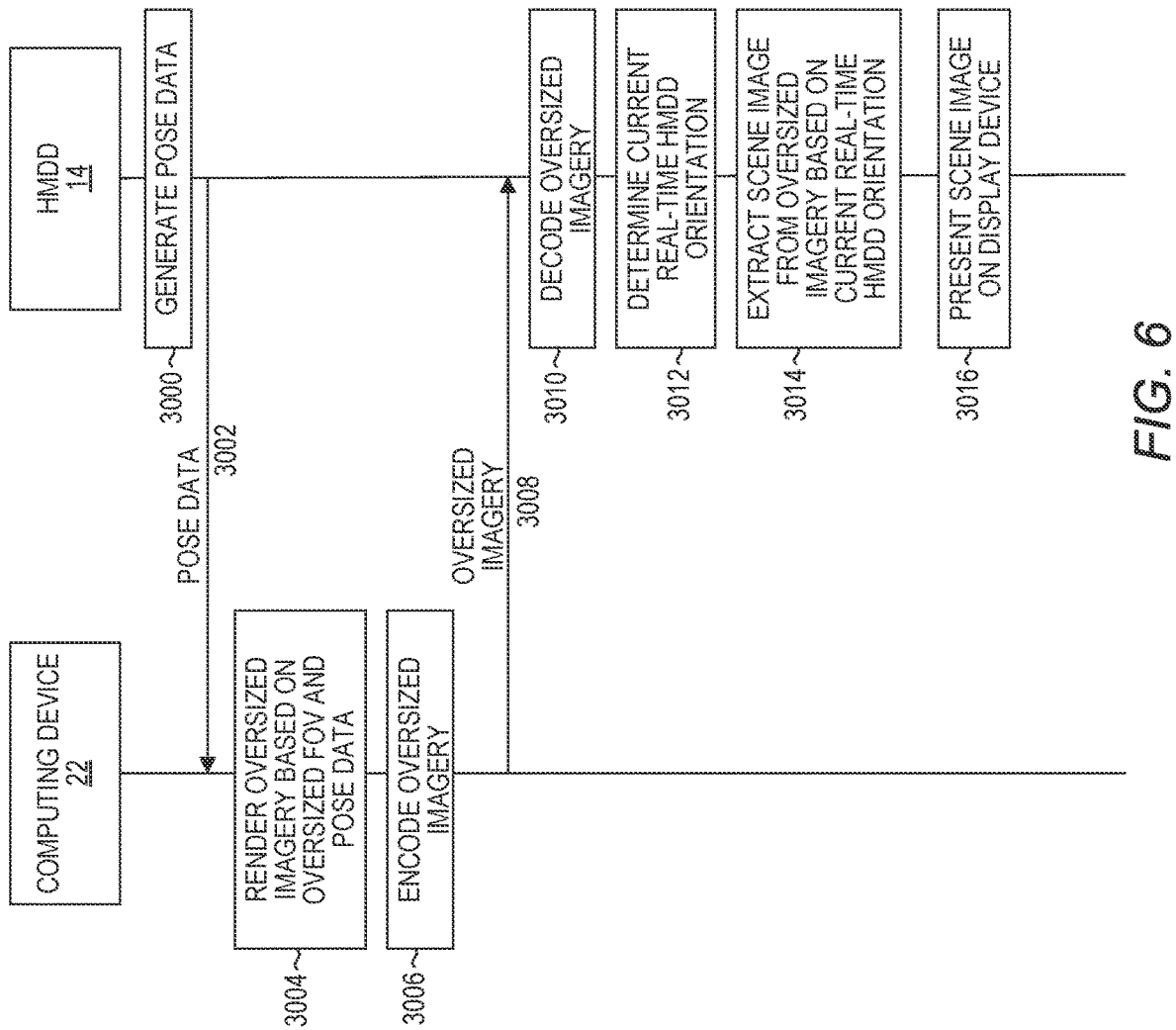
FIG. 6 is a message sequence diagram of the environment illustrated in FIG. 3 illustrating messages that may be generated and actions taken when compensating for latency in a streaming VR environment in accordance with one embodiment.

FIG. 6 is a message sequence diagram of the streaming VR environment 10-1 illustrated in FIG. 3 illustrating messages that may be generated and actions taken when compensating for latency in a streaming VR environment in accordance with one embodiment. The HMDD 14 generates the pose data 30 that identifies a current orientation of the HMDD 14 and sends the pose data 30 to the computing device 22 (FIG. 6, steps 3000-3002). The computing device 22 renders the oversized imagery 86 based on the oversized FOV 88 and the pose data 30 (FIG. 6, step 3004). The computing device 22 encodes the oversized imagery 86 via a compression encoder, such as a MPEG encoder, or the like (FIG. 6, step 3006). The computing device 22 sends the encoded oversized imagery 86 to the HMDD 14 (FIG. 6, step 3008). The HMDD 14 decodes the oversized imagery 86 (FIG. 6, step 3010). The HMDD 14 determines the current real-time HMDD orientation 90 (FIG. 6, step 3012). The HMDD 14 extracts the scene image 92 from the oversized imagery 86 based on the current real-time HMDD orientation 90 (FIG. 6, step 3014). The HMDD 14 presents the scene image 92 on the display device 62 (FIG. 6, step 3016).

Figure 7:
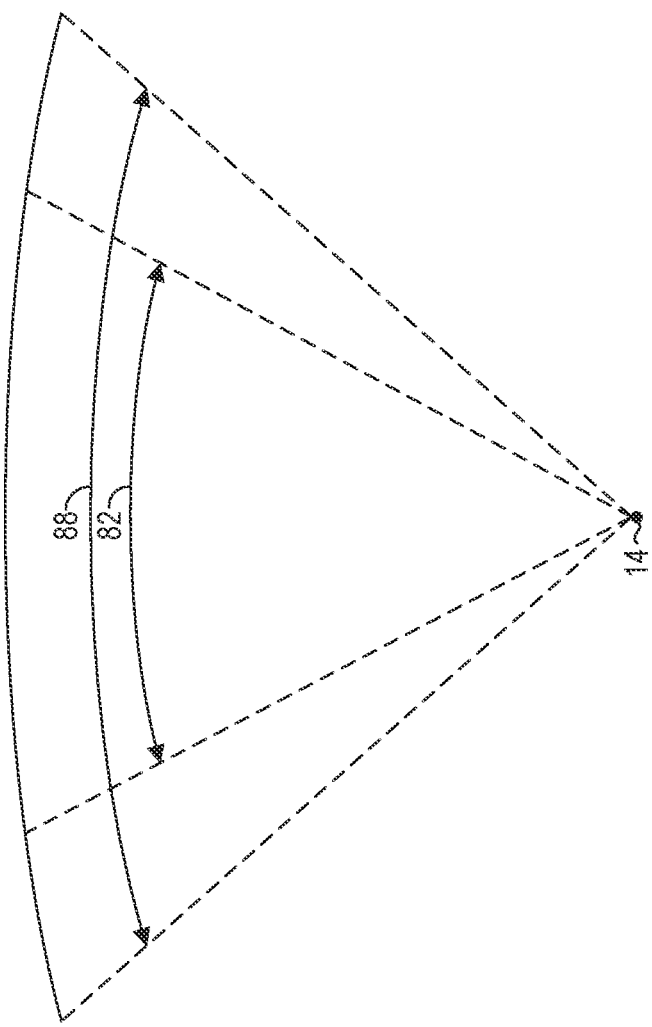
FIG. 7 is a diagram of a field of view (FOV) and an oversized FOV according to one embodiment.

FIG. 7 is a diagram of an FOV 82 and an oversized FOV 88 according to one embodiment. The determination of the oversized FOV 88 in accordance with one embodiment will be discussed in conjunction with FIG. 3. Assume for purposes of illustration that the participant 12 (FIG. 3) selects the VR content 66-1 to participate in the virtual world implemented by the VR content 66-1. As discussed above, the virtual world implemented by the VR content 66-1 could depict any desired VR experience, such as playing a board game, participating in a first person shooter game, roaming about a remote location that closely approximates a real-world location such as a foreign city, or the like.

The simulator 76 receives the request and determines the FOV 82 of the HMDD 14. The FOV 82 may be determined, by way of non-limiting example, by accessing the user profile 74 associated with the participant 12, or via one or more communications with the HMDD 14. The simulator 76 accesses the HMQ 72-1 in the metadata 70-1 of the VR content 66-1. In this example, the HMQ 72-1 quantifies a maximum head rotation velocity in radians/second. The simulator 76 then determines the RTT value 96. In this embodiment, the computing device 22 starts a timer and sends an ICMP echo request to the HMDD 14. The computing device 22 receives a response to the ICMP echo request from the HMDD 14 and stops the timer. The computing device 22 adds a predetermined value to account for image processing and other activities of the computing device 22 and the HMDD 14 for each frame.

The simulator 76 then determines an update FOV ($FOV_{update}$) in accordance with the following formula:

$$FOV_{update} = \frac{\omega \times L_{total}}{1000} \times \frac{180}{\pi} \ (deg)$$

wherein:
ω: HMQ 72-1 (Head rotation velocity in radians/second)
$L_{total}$: RTT value 96 (Total RTT latency in milliseconds including WAN delay, LAN delay, rendering, encoding, and decoding)

The simulator 76 determines the oversized FOV 88 in accordance with the following formula:

oversized FOV 88=FOV 82+$FOV_{update}$

Note that this is for the horizontal FOV of the HMDD 14. In some embodiments, the oversized FOV 88 may also include a vertical oversized FOV. The vertical oversized FOV may be, in some embodiments, a factor, such as 0.9, 0.8, or the like, of the horizontal oversized FOV. In some embodiments, the HMQ 72-1 may include two quantifiers, one that quantifies a horizontal maximum head rotation velocity and one that quantifies a vertical maximum head rotation velocity. The oversized vertical FOV may be determined in the same manner as discussed above with regard to the oversized horizontal FOV.

Figure 8:
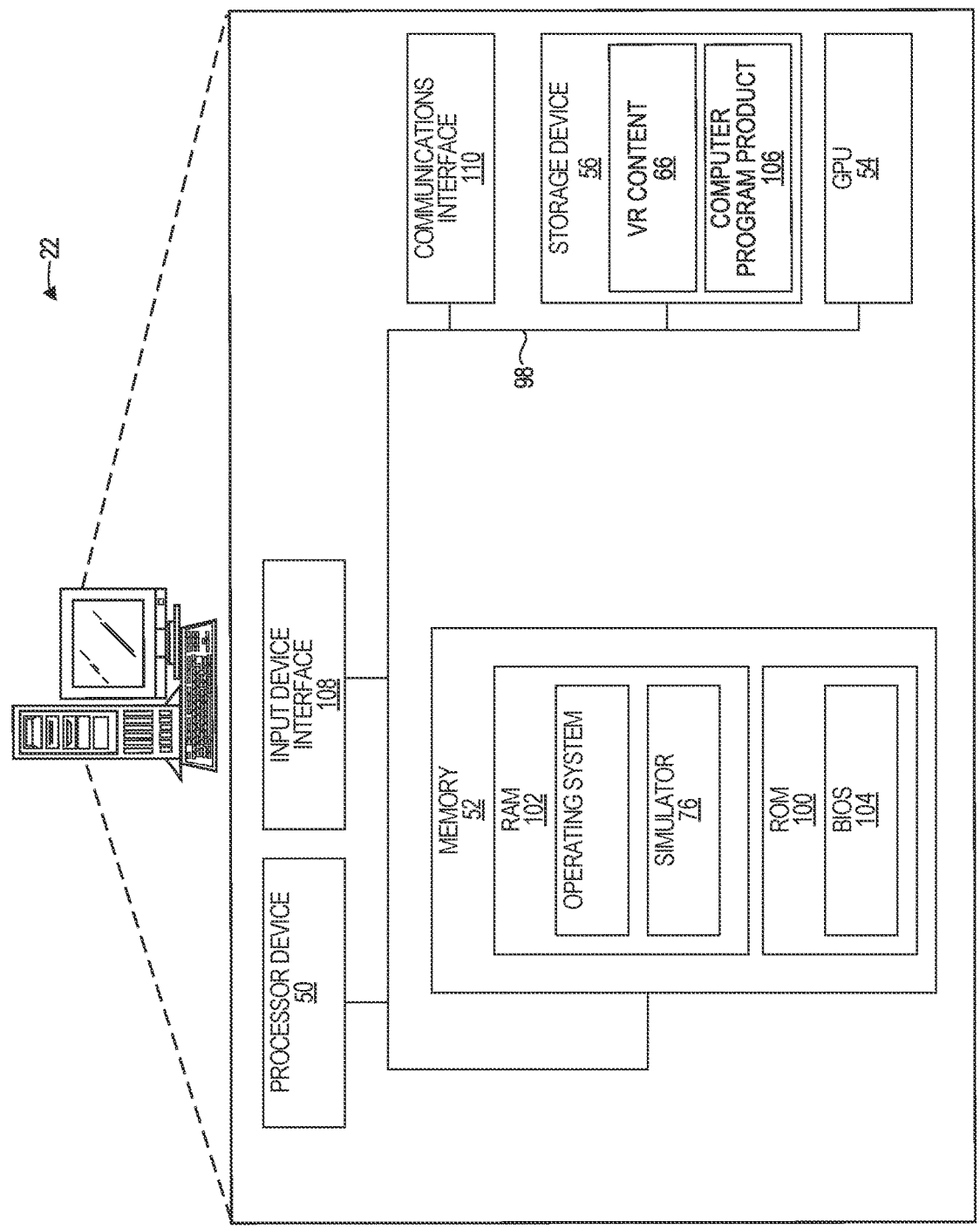
FIG. 8 is a block diagram of a computing device suitable for implementing embodiments disclosed herein.

FIG. 8 is a block diagram of the computing device 22 suitable for implementing examples according to one example. The computing device 22 may comprise any computing or electronic device capable of including firmware, hardware, and/or executing software instructions to implement the functionality described herein, such as a computer server or the like. The computing device 22 includes the processor device 50, the memory 52, and a system bus 98. The system bus 98 provides an interface for system components including, but not limited to, the memory 52 and the processor device 50. The processor device 50 can be any commercially available or proprietary processor.

The system bus 98 may be any of several types of bus structures that may further interconnect to a memory bus (with or without a memory controller), a peripheral bus, and/or a local bus using any of a variety of commercially available bus architectures. The memory 52 may include non-volatile memory 100 (e.g., read-only memory (ROM), erasable programmable read-only memory (EPROM), electrically erasable programmable read-only memory (EEPROM), etc.), and volatile memory 102 (e.g., random-access memory (RAM)). A basic input/output system (BIOS) 104 may be stored in the non-volatile memory 100 and can include the basic routines that help to transfer information between elements within the computing device 22. The volatile memory 102 may also include a high-speed RAM, such as static RAM, for caching data.

The computing device 22 may further include or be coupled to a non-transitory computer-readable storage medium such as the storage device 56, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 56 and other drives associated with computer-readable media and computer-usable media may provide non-volatile storage of data, data structures, computer-executable instructions, and the like.

A number of modules can be stored in the storage device 56 and in the volatile memory 102, including an operating system and one or more program modules, such as the simulator 76, which may implement the functionality described herein in whole or in part. All or a portion of the examples may be implemented as a computer program product 106 stored on a transitory or non-transitory computer-usable or computer-readable storage medium, such as the storage device 56, which includes complex programming instructions, such as complex computer-readable program code, to cause the processor device 50 to carry out the steps described herein. Thus, the computer-readable program code can comprise software instructions for implementing the functionality of the examples described herein when executed on the processor device 50. The processor device 50, in conjunction with the simulator 76 in the volatile memory 102, may serve as a controller, or control system, for the computing device 22 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 50 through an input device interface 108 coupled to the system bus 98 but can be connected through other interfaces such as a parallel port, an Institute of Electrical and Electronic Engineers (IEEE) 1394 serial port, a Universal Serial Bus (USB) port, an IR interface, and the like.

The computing device 22 may also include a communications interface 110 suitable for communicating with the network 26-1 as appropriate or desired. The computing device 22 includes one or more GPUs 54.

Figure 9:
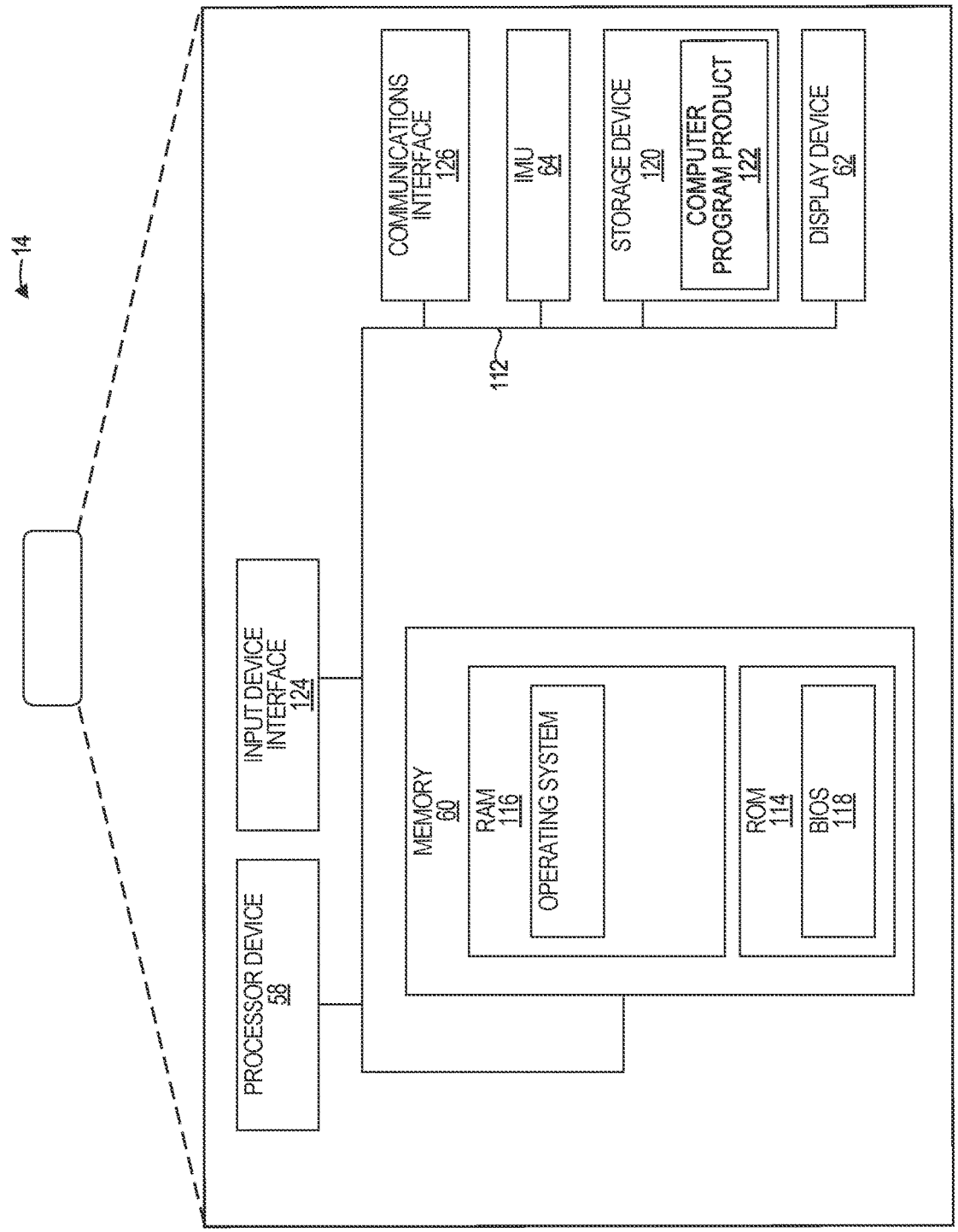
FIG. 9 is a block diagram of an HMDD suitable for implementing embodiments disclosed herein.

FIG. 9 is a block diagram of the HMDD 14 according to one embodiment. The HMDD 14 includes the processor device 58, the memory 60, and a system bus 112. The system bus 112 provides an interface for system components including, but not limited to, the memory 60 and the processor device 58. The processor device 58 can be any commercially available or proprietary processor.

The system bus 112 may be any of several types of bus structures that may further interconnect to a memory bus (with or without a memory controller), a peripheral bus, and/or a local bus using any of a variety of commercially available bus architectures. The memory 60 may include non-volatile memory 114 (e.g., read-only memory (ROM), erasable programmable read-only memory (EPROM), electrically erasable programmable read-only memory (EEPROM), etc.), and volatile memory 116 (e.g., random-access memory (RAM)). A basic input/output system (BIOS) 118 may be stored in the non-volatile memory 114 and can include the basic routines that help to transfer information between elements within the HMDD 14. The volatile memory 116 may also include a high-speed RAM, such as static RAM, for caching data.

The HMDD 14 may further include a non-transitory computer-readable storage medium such as a storage device 120, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 120 and other drives associated with computer-readable media and computer-usable media may provide non-volatile storage of data, data structures, computer-executable instructions, and the like.

A number of modules can be stored in the storage device 120 and in the volatile memory 116, including an operating system and one or more program modules, which may implement the functionality described herein in whole or in part. All or a portion of the examples may be implemented as a computer program product 122 stored on a transitory or non-transitory computer-usable or computer-readable storage medium, such as the storage device 120, which includes complex programming instructions, such as complex computer-readable program code, to cause the processor device 58 to carry out the steps described herein. Thus, the computer-readable program code can comprise software instructions for implementing the functionality of the examples described herein when executed on the processor device 58.

An operator may also be able to enter one or more configuration commands through buttons or other input controls integrated into the HMDD 14, or via an external interface controlled by an external interface such as a keyboard (not illustrated) or a pointing device such as a mouse. Such input devices may be connected to the processor device 58 through an input device interface 124 is coupled to the system bus 112 but can be connected by other interfaces such as a parallel port, an Institute of Electrical and Electronic Engineers (IEEE) 1394 serial port, a Universal Serial Bus (USB) port, an IR interface, and the like.

The HMDD 14 may also include a communications interface 126 suitable for communicating with the network 26-1 as appropriate or desired. The HMDD 14 includes the IMU 64 and the display device 62. In some embodiments the HMDD 14 does not include a GPU.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    determining, by a head-mounted display device (HMDD) having a field of view (FOV), first pose data that identifies an orientation of the HMDD worn by a participant viewing a virtual world via the HMDD;
    sending, by the HMDD to a computing device via a network, the first pose data;
    receiving, by the HMDD from the computing device, first oversized imagery generated based on the first pose data and a first oversized FOV that is larger than the FOV, wherein the first oversized imagery depicts a first oversized scene in the virtual world that is larger than a first scene encompassed by the FOV of the HMDD and the first oversized FOV is based at least in part on a predetermined head movement quantifier quantifying a rotational velocity of a head movement for the virtual world;
    determining, by the HMDD, a real-time orientation of the HMDD;
    extracting, from the first oversized imagery, an extracted portion of the first oversized imagery that depicts a portion of the virtual world encompassed by the FOV of the HMDD based on the real-time orientation of the HMDD; and
    presenting the extracted portion on a display device of the HMDD.

2. The method of claim 1 further comprising:
    presenting, by the HMDD on the display device, a menu identifying a plurality of virtual worlds, including the virtual world;
    receiving, by the HMDD, a selection of the virtual world; and
    sending, to the computing device, information that identifies the FOV of the HMDD.

3. The method of claim 2 wherein sending the information that identifies the FOV of the HMDD further comprises sending information that identifies a horizontal FOV of the HMDD and a vertical FOV of the HMDD.

4. The method of claim 1 further comprising:
    receiving, from the computing device, an internet control message protocol (ICMP) echo request; and
    sending, by the HMDD to the computing device, a response to the ICMP echo request.

5. The method of claim 4 further comprising, subsequent to sending the response to the ICMP echo request:
    determining, by the HMDD, second pose data that identifies the orientation of the HMDD worn by the participant viewing the virtual world via the HMDD;
    sending, by the HMDD to the computing device via the network, the second pose data;
    receiving, by the HMDD from the computing device, second oversized imagery generated based on the second pose data and a second oversized FOV that is larger than the FOV and smaller than the first oversized FOV, wherein the second oversized imagery depicts a second oversized scene in the virtual world that is larger than a second scene encompassed by the FOV of the HMDD;
    determining, by the HMDD, the real-time orientation of the HMDD;
    extracting, from the second oversized imagery, an extracted portion of the second oversized imagery that depicts a portion of the virtual world encompassed by the FOV of the HMDD based on the real-time orientation of the HMDD; and
    presenting the extracted portion on the display device of the HMDD.

6. The method of claim 1 wherein the first oversized imagery comprises rendered imagery, and wherein the HMDD lacks a graphics processing unit (GPU) and the extracted portion of the first oversized imagery is extracted without rendering the extracted portion.

7. The method of claim 1, wherein the first oversized FOV is based at least in part on a round-trip time value quantifying an elapsed time of a signal communicated from the computing device through the network to the HMDD and receipt, by the computing device, of a response from the HMDD to the signal.

8. A head mounted display device (HMDD), comprising:
a memory; and
a processor device coupled to the memory configured to:
  determine first pose data that identifies an orientation of the HMDD worn by a participant viewing a virtual world via the HMDD;
  send, to a computing device via a network, the first pose data;
  receive, from the computing device, first oversized imagery generated based on the first pose data and a first oversized field of view (FOV) that is larger than an FOV of the HMDD, wherein the first oversized imagery depicts a first oversized scene in the virtual world that is larger than a first scene encompassed by the FOV of the HMDD and the first oversized FOV is based at least in part on a predetermined head movement quantifier quantifying a rotational velocity of a head movement for the virtual world;
  determine a real-time orientation of the HMDD;
  extract, from the first oversized imagery, an extracted portion of the first oversized imagery that depicts a portion of the virtual world encompassed by the FOV of the HMDD based on the real-time orientation of the HMDD; and
  present the extracted portion on a display device of the HMDD.

9. The HMDD of claim 8, wherein the processor device is further configured to:
  present, on the display device, a menu identifying a plurality of virtual worlds, including the virtual world;
  receive a selection of the virtual world; and
  send, to the computing device, information that identifies the FOV of the HMDD.

10. The HMDD of claim 9, wherein, to send the information that identifies the FOV of the HMDD, the processor device is further configured to send information that identifies a horizontal FOV of the HMDD and a vertical FOV of the HMDD.

11. The HMDD of claim 8, wherein the processor device is further configured to:
  receive, from the computing device, an internet control message protocol (ICMP) echo request; and
  send, to the computing device, a response to the ICMP echo request.

12. The HMDD of claim 11 wherein, subsequent to sending the response to the ICMP echo request, the processor device is further configured to:
  determine, second pose data that identifies the orientation of the HMDD worn by the participant viewing the virtual world via the HMDD;
  send, to the computing device via the network, the second pose data;
  receive, from the computing device, second oversized imagery generated based on the second pose data and a second oversized FOV that is larger than the FOV and smaller than the first oversized FOV, wherein the second oversized imagery depicts a second oversized scene in the virtual world that is larger than a second scene encompassed by the FOV of the HMDD;
  determine the real-time orientation of the HMDD;
  extract, from the second oversized imagery, an extracted portion of the second oversized imagery that depicts a portion of the virtual world encompassed by the FOV of the HMDD based on the real-time orientation of the HMDD; and
  present the extracted portion on the display device of the HMDD.

13. The HMDD of claim 8, wherein the first oversized imagery comprises rendered imagery, and wherein the HMDD lacks a graphics processing unit (GPU) and the extracted portion of the first oversized imagery is extracted without rendering the extracted portion.

14. A non-transitory computer-readable storage medium that includes executable instructions configured to cause a processor device to:
  determine first pose data that identifies an orientation of a head-mounted display device (HMDD) having a field of view (FOV) worn by a participant viewing a virtual world via the HMDD;
  send, to a computing device via a network, the first pose data;
  receive, from the computing device, first oversized imagery generated based on the first pose data and a first oversized field of view (FOV) that is larger than an FOV of the HMDD, wherein the first oversized imagery depicts a first oversized scene in the virtual world that is larger than a first scene encompassed by the FOV of the HMDD and the first oversized FOV is based at least in part on a predetermined head movement quantifier quantifying a rotational velocity of a head movement for the virtual world;
  determine a real-time orientation of the HMDD;
  extract, from the first oversized imagery, an extracted portion of the first oversized imagery that depicts a portion of the virtual world encompassed by the FOV of the HMDD based on the real-time orientation of the HMDD; and
  present the extracted portion on a display device of the HMDD.

15. The non-transitory computer-readable storage medium of claim 14, wherein the instructions further cause the processor device to:
  present, on the display device, a menu identifying a plurality of virtual worlds, including the virtual world;
  receive a selection of the virtual world; and
  send, to the computing device, information that identifies the FOV of the HMDD.

16. The non-transitory computer-readable storage medium of claim 15, wherein, to send the information that identifies the FOV of the HMDD, the instructions further cause the processor device to send information that identifies a horizontal FOV of the HMDD and a vertical FOV of the HMDD.

17. The non-transitory computer-readable storage medium of claim 14, wherein the instructions further cause the processor device to:
  receive, from the computing device, an internet control message protocol (ICMP) echo request; and
  send, to the computing device, a response to the ICMP echo request.

18. The non-transitory computer-readable storage medium of claim 17 wherein, subsequent to sending the response to the ICMP echo request, the instructions further cause the processor device to:
  determine, second pose data that identifies the orientation of the HMDD worn by the participant viewing the virtual world via the HMDD;
  send, to the computing device via the network, the second pose data;
  receive, from the computing device, second oversized imagery generated based on the second pose data and a second oversized FOV that is larger than the FOV and smaller than the first oversized FOV, wherein the second oversized imagery depicts a second oversized scene in the virtual world that is larger than a second scene encompassed by the FOV of the HMDD;

determine the real-time orientation of the HMDD;

extract, from the second oversized imagery, an extracted portion of the second oversized imagery that depicts a portion of the virtual world encompassed by the FOV of the HMDD based on the real-time orientation of the HMDD; and present the extracted portion on the display device of the HMDD.

19. The non-transitory computer-readable storage medium of claim 14, wherein the first oversized imagery comprises rendered imagery, and wherein the HMDD lacks a graphics processing unit (GPU) and the extracted portion of the first oversized imagery is extracted without rendering the extracted portion.

* * * * *